United States Patent
Zhang et al.

(10) Patent No.: US 10,509,842 B2
(45) Date of Patent: Dec. 17, 2019

(54) METHOD AND DEVICE FOR REFRESHING NEWS LIST

(71) Applicant: Beijing Bytedance Network Technology Co., Ltd., Beijing (CN)

(72) Inventors: Yiming Zhang, Beijing (CN); Jingjin Zhou, Beijing (CN); Huanhuan Cao, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 283 days.

(21) Appl. No.: 15/519,756

(22) PCT Filed: Jul. 10, 2015

(86) PCT No.: PCT/CN2015/083803
§ 371 (c)(1),
(2) Date: Apr. 17, 2017

(87) PCT Pub. No.: WO2016/058423
PCT Pub. Date: Apr. 21, 2016

(65) Prior Publication Data
US 2017/0242930 A1     Aug. 24, 2017

(30) Foreign Application Priority Data

Oct. 17, 2014     (CN) .......................... 2014 1 0555495

(51) Int. Cl.
*G06F 16/957*     (2019.01)
*G06F 16/9535*     (2019.01)
(Continued)

(52) U.S. Cl.
CPC ........ *G06F 16/9574* (2019.01); *G06F 3/0482* (2013.01); *G06F 3/0488* (2013.01);
(Continued)

(58) Field of Classification Search
CPC ............. G06F 16/9574; G06F 16/2477; G06F 16/248; G06F 16/9535; G06F 3/0482; G06F 3/0488; G06F 16/957
(Continued)

(56) References Cited

U.S. PATENT DOCUMENTS 5,907,681 A * 5/1999 Bates ...................... G06F 9/451
                                                    709/228
6,032,182 A * 2/2000 Mullen-Schultz ..........................
                                                 G06F 16/9562
                                                    709/223

(Continued)

FOREIGN PATENT DOCUMENTS

CN     102024031 A     4/2011
CN     102737082 A     10/2012
(Continued)

OTHER PUBLICATIONS

Article "10 of the best news apps for iPhone and Android", published on Mar. 9, 2015, 7pages, accessed online at <https://internet.com/internet-news/10-of-the-best-news-apps-for-iPhone-and-Android/> on Mar. 20, 2019 (Year: 2015).*

(Continued)

*Primary Examiner* — Phuong Thao Cao
(74) *Attorney, Agent, or Firm* — Dorsey & Whitney LLP

(57) ABSTRACT

Provided is a method and device for refreshing a news list, wherein the method includes: receiving a refreshing signal; reading a refreshing start time according to the received refreshing signal; reading at least one preset time threshold, the preset time threshold is used for defining, in combination with the refreshing start time, a time interval for refreshing a news list; acquiring a recommended news list according to the refreshing start time and the preset time threshold, the recommended news list including: at least one piece of news to be recommended, the publication time of the news to be (Continued)

recommended falls within the time interval; allocating a recommending time for each piece of news to be recommended in the recommended news list; and refreshing the news to be recommended in the recommended news list according to the recommending time, so as to generate a new recommended news list.

19 Claims, 7 Drawing Sheets

(51) Int. Cl.
    *G06F 3/0488* (2013.01)
    *G06F 16/248* (2019.01)
    *G06F 16/2458* (2019.01)
    *G06F 3/0482* (2013.01)

(52) U.S. Cl.
    CPC ........ *G06F 16/248* (2019.01); *G06F 16/2477* (2019.01); *G06F 16/9535* (2019.01)

(58) Field of Classification Search
    USPC .......................................................... 707/722
    See application file for complete search history.

(56) References Cited

U.S. PATENT DOCUMENTS

| | | | | |
|---|---|---|---|---|
| 6,292,835 | B1* | 9/2001 | Huang | H04L 47/10 709/235 |
| 6,959,295 | B1* | 10/2005 | Puscar | G06F 16/951 |
| 2005/0034070 | A1* | 2/2005 | Meir | G06K 15/00 715/255 |
| 2005/0096039 | A1* | 5/2005 | Haberman | H04W 4/06 455/422.1 |
| 2005/0262145 | A1* | 11/2005 | Kawano | H04N 7/17318 |
| 2009/0276709 | A1* | 11/2009 | Venneman | G06F 16/639 715/716 |
| 2009/0300547 | A1* | 12/2009 | Bates | G06F 16/954 715/825 |
| 2010/0100845 | A1 | 4/2010 | Khan et al. | |
| 2011/0010307 | A1* | 1/2011 | Bates | G06Q 30/02 705/347 |
| 2011/0184899 | A1* | 7/2011 | Gadanho | G06Q 30/02 706/46 |
| 2012/0072444 | A1* | 3/2012 | Sharp | G06F 3/0481 707/769 |
| 2012/0159336 | A1* | 6/2012 | Norwood | G06F 3/0482 715/733 |
| 2012/0297011 | A1 | 11/2012 | Yu et al. | |
| 2013/0145318 | A1* | 6/2013 | Hosotsubo | G06F 16/93 715/811 |
| 2013/0290110 | A1* | 10/2013 | LuVogt | G06F 16/9535 705/14.66 |
| 2013/0290339 | A1* | 10/2013 | LuVogt | G06Q 10/10 707/740 |
| 2013/0290905 | A1* | 10/2013 | LuVogt | G06N 3/006 715/835 |
| 2013/0337785 | A1* | 12/2013 | Delug | H04W 4/60 455/414.1 |
| 2014/0245339 | A1* | 8/2014 | Zhang | H04N 21/8358 725/18 |
| 2014/0379806 | A1* | 12/2014 | Zhang | G06Q 10/10 709/204 |
| 2015/0019642 | A1* | 1/2015 | Wang | H04L 67/306 709/204 |
| 2015/0177932 | A1 | 6/2015 | Yoo et al. | |
| 2015/0186390 | A1* | 7/2015 | Katic | G06F 16/9574 709/203 |
| 2015/0193448 | A1* | 7/2015 | Jeong | G06F 16/3322 707/767 |
| 2015/0296072 | A1* | 10/2015 | Zhou | H04M 1/72525 455/414.1 |
| 2016/0217377 | A1* | 7/2016 | Senarath | H04L 67/2847 |
| 2016/0371589 | A1* | 12/2016 | Golbandi | G06Q 30/0241 |

FOREIGN PATENT DOCUMENTS

| | | | | |
|---|---|---|---|---|
| CN | 102831234 | A | | 12/2012 |
| CN | 103164317 | A | | 6/2013 |
| CN | 103399884 | A | * | 11/2013 |
| CN | 103399884 | A | | 11/2013 |
| CN | 103428075 | A | | 12/2013 |
| CN | 103747343 | A | | 4/2014 |
| CN | 104239587 | A | | 12/2014 |
| CN | 102831234 | B | * | 4/2015 |
| WO | WO-2007101113 | A1 | * | 9/2007 ......... H04L 67/1095 |
| WO | WO-2010085874 | A1 | * | 8/2010 ............ G06Q 50/10 |

OTHER PUBLICATIONS

Phelan et al., "Using Twitter to Recommend Real-Time Topical News", Proceedings of the Third ACM Conference on Recommender Systems, New York, New York, USA, Oct. 23-25, 2009, pp. 385-388. (Year: 2009).*

Nanas et al., "Personalised News and Scientific Literature Aggregation", Information Processing and Management, vol. 46, Issue 3, May 2010, pp. 268-283. (Year: 2010).*

International Search Report and Written Opinion dated Sep. 25, 2015 in connection with International Patent Application No. PCT/CN2015/083803, 18 pages including English Translation.

Extended European Search Report dated Mar. 28, 2018 in connection with European Patent Application No. 15850122.1, 12 pages.

Tavakolifard, Mozhgan et al. "Tailored News in the Palm of Your HAND: A Multi-Perspective Transparent Approach to News Recommendation." World Wide Web Companion, May 17, 2013, pp. 305-308.

* cited by examiner

| |
|---|
| NBA latest game report within one hour |
| Putin offers a proposal to the issue about Ukraine within one hour |
| Thirty Million of new assistance from Bayern is determined within two hours |
| O2O wild ambition of Baidu two hours ago |
| The United States launched air strikes against the Islamic two hours ago |

Fig.1

(PRIOR ART)

METHOD AND DEVICE FOR REFRESHING NEWS LIST

CROSS REFERENCE TO RELATED APPLICATIONS

This application claims the benefit of priority to Chinese patent application no. 201410555495.4 filed 17 Oct. 2014, which is hereby incorporated herein by reference in its entirety.

This application is a national stage application of PCT Application No. PCT/CN2015/083803 filed on 10 Jul. 2015 entitled "Method And Device For Refreshing News List."

TECHNICAL FIELD

The embodiments of the disclosure relate to the computer field and, more particularly, to a method and device for refreshing a news list.

BACKGROUND

In the mobile Internet era, news reading is increasingly showing the characteristics of fragmentation. Compared to the PC era in which users generally browse news in a fixed period of time, mobile users may open a news client at any time when bored to browse the news of interest. Therefore, the news client based on the smart phone is increasingly becoming the main tool for the majority of Internet users to acquire news. The user experience of most of the news clients basically follows the logic of a traditional portal. For both the home page and the channel, the news is edited and artificially selected or recommended by a recommendation algorithm, and the news is generally sorted in a certain time granularity according to the publication time. Here the time granularity can be at a level of a minute, an hour, three hours and so on. Users will generally feel very uncomfortable since they are unable to perceive how much content has not been browsed when browsing. In addition, according to the news sorting method of the traditional news client based on the publication time, there will be a regret of missing good news. For example, the user opened the news client at 9:00 am, in which the news sorting is as shown in FIG. 1. The user opened the news client again at 11:00 am in the spare time. At this time, if it should be ensured that the news list is sorted at a granularity at a level of an hour, the newly recommended news can only be the news published after 9:00 am and before 11:00 am. If the news is not high in quality or there is no new news (there is newly published news but its content is the same as the previous news so that it is not appropriate to recommend) during this time period, users have to either browse these low-quality news or simply cannot refresh more content. In fact, the 7:00 am to 9:00 am is the peak in which high-quality news is published. Because the layout is the restricted, the news displayed to users in the last time is only a part of carefully selected news. There is no chance to display a lot of high-quality news. It would be a pity that it would not recommend this part of news just because the time of the news list should be kept in order.

There is no effective solution for the problem in the traditional art that more pieces of news cannot be refreshed via a refreshing operation due to the fact that a news client sorts news according to the publication time of the news.

SUMMARY

The main object of the embodiments of the disclosure is to provide a method and device for refreshing a news list for solving the problem in the traditional art that more pieces of news cannot be refreshed via a refreshing operation due to the fact that a news client sorts news according to the publication time of the news.

In order to achieve the above object, according to an aspect of an embodiment of the disclosure, there is provided a method for refreshing a news list. The method includes: receiving a refreshing signal; reading a refreshing start time according to the received refreshing signal, wherein the refreshing start time is the current system time or a recommending time for the last piece of news that has been refreshed; reading at least one pre-set time threshold, the time threshold is used for defining, in combination with the refreshing start time, a time interval for refreshing a news list; acquiring a recommended news list according to the refreshing start time and the time threshold, the recommended news list including: at least one piece of news to be recommended, the publication time of the news to be recommended falls within the time interval; allocating a recommending time for each piece of news to be recommended in the recommended news list; and refreshing the news to be recommended in the recommended news list according to the recommended time to generate a new recommended news list.

In order to achieve the above object, according to another aspect of an embodiment of the disclosure, there is provided a device for refreshing a news list, wherein the device includes: a receiving component configured to receive a refreshing signal; a first reading component configured to read a refreshing start time according to the received refreshing signal, wherein the refreshing start time is the current system time or a recommending time for the last piece of news that has been refreshed; a second reading component configured to read at least one pre-set time threshold, the time threshold is used for defining, in combination with the refreshing start time, a time interval for refreshing a news list; a first acquiring component configured to acquire a recommended news list according to the refreshing start time and the time threshold, the recommended news list including: at least one piece of news to be recommended, the publication time of the news to be recommended falls within the time interval; a first processing component configured to allocate a recommending time for each piece of news to be recommended in the recommended news list; and a generating component configured to refresh the news to be recommended in the recommended news list according to the recommended time to generate a new recommended news list.

According to an embodiment of the disclosure, by receiving a refreshing signal; reading a refreshing start time according to the received refreshing signal, wherein the refreshing start time is the current system time or a recommending time for the last piece of news that has been refreshed; reading at least one pre-set time threshold, the time threshold is used for defining, in combination with the refreshing start time, a time interval for refreshing a news list; acquiring a recommended news list according to the refreshing start time and the time threshold, the recommended news list including: at least one piece of news to be recommended, the publication time of the news to be recommended falls within the time interval; allocating a recommending time for each piece of news to be recommended in the recommended news list; and refreshing the news to be recommended in the recommended news list according to the recommended time to generate a new recommended news list, the problem in the traditional art is solved that more pieces of news cannot be refreshed via a refreshing operation due to the fact that a news client sorts news according to the publication time of the news. The effect is achieved that all the news during that day can be refreshed only via a refreshing operation.

In order to achieve the above and related objects, one or more aspects of the embodiments of the disclosure include those features which will be described in detail later and particularly pointed out in the claims. The following description and the accompanying drawings illustrate some exemplary aspects of the embodiments of the disclosure. However, these aspects merely illustrate some of the various ways in which the principles of the embodiments of the disclosure may be used. In addition, the embodiments of the disclosure is intended to cover all such aspects and equivalents thereof.

BRIEF DESCRIPTION OF THE DRAWINGS

Other objects and results of the embodiments of the disclosure will become more apparent and readily understood with reference to the following description taken in conjunction with the accompanying drawings and the appended claims. The drawings forming a part of the embodiments of the disclosure are described here to provide further understanding of the embodiments of the disclosure. The schematic embodiments and description of the embodiments of the disclosure are adopted to explain the embodiments of the disclosure, and do not form improper limits to the embodiments of the disclosure. In the drawings:

FIG. 1 is a schematic diagram of an interface of a mobile news client provided by the traditional art;

DETAILED DESCRIPTION OF THE EMBODIMENTS

It is to be noted that the embodiments of the present application and the characteristics in the embodiments may be combined with each other under the condition of no conflicts. The embodiments of the disclosure are described below with reference to the drawings and the embodiments in detail.

In order to make a better understanding of the solution of the embodiments of the disclosure by those skilled in the art, the technical solutions in the embodiments of the disclosure will be described clearly and completely in conjunction with the accompanying drawings in the embodiments of the disclosure, and it will be apparent that the described embodiments are merely a part of the embodiments of the disclosure rather than all embodiments. All other embodiments acquired by those of ordinary skill in the art without making creative work are intended to be within the scope of protection of the embodiments of the disclosure, based on embodiments of the disclosure.

It is to be noted that the terms such as "a first" and "a second" in the specification and claims of the disclosure and in the above accompanying drawings are used to distinguish similar objects and are not necessarily used to describe a particular order or sequence. It is to be understood that the data thus used are interchangeable where appropriate to enable the embodiments of the disclosure to be described herein. In addition, the terms such as "including", "having" or any other variants thereof are intended to cover a non-exclusive inclusion. For example, a process, method, system, product or device that includes a series of steps or units is not necessarily limited to those explicitly listed steps or units, but may include other steps or units that are not explicitly listed or inherent to these processes, methods, products, or devices.

Embodiment 1

The embodiment of the disclosure provides a method for refreshing a news list.

Figure 2:
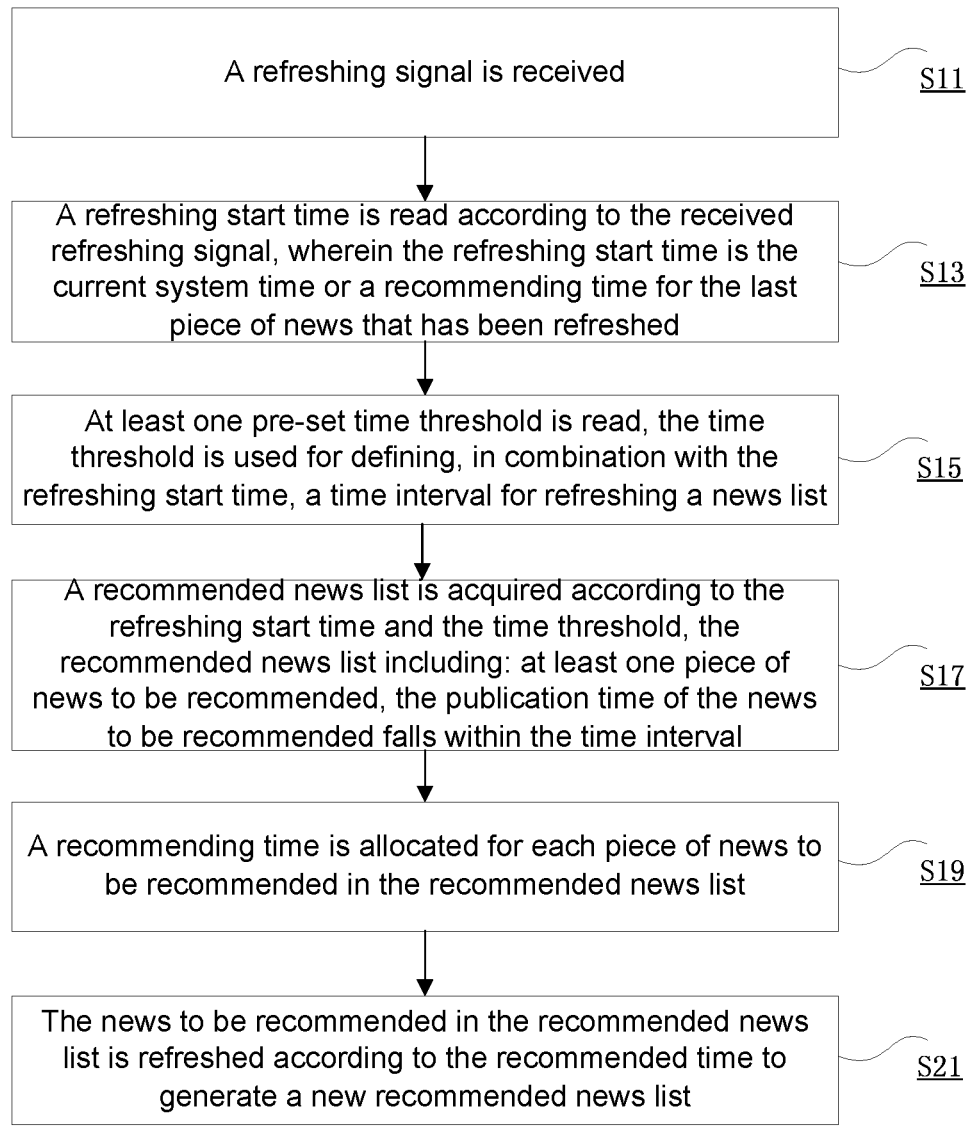
FIG. 2 is a flow diagram of a method for refreshing a news list according to a first embodiment of the disclosure.

FIG. 2 is a flow diagram of a method for refreshing a news list according to an embodiment of the disclosure. As shown in FIG. 2, the method includes the following steps.

Step S11: A refreshing signal is received.

In the above Step S11 of the present application, the refreshing process is triggered by receiving the refreshing signal, and the refreshing function of the news list is realized.

In practice, taking the news client running on the touchscreen mobile phone as an example, the above refreshing signal may be a signal generated by dragging a region of the page, or may be a signal generated by clicking a region on the screen, or may be a refreshing signal automatically generated by the system by setting the refreshing time for the system.

Step S13: A refreshing start time is read according to the received refreshing signal, wherein the refreshing start time is the current system time or a recommending time for the last piece of news that has been refreshed.

In the above Step S13 of the present application, the refreshing type is judged according to the received refreshing signal. The refreshing start time corresponding to the refreshing type is recorded according to different refreshing types.

In practice, taking the news client running on the touchscreen mobile phone as an example, the refreshing type can be divided into two types, that is, refreshing the latest news and refreshing the historical news. The refreshing start time corresponding to the refreshing type is read recorded according to different refreshing types, respectively.

Step S15: At least one pre-set time threshold is read, the time threshold is used for defining, in combination with the refreshing start time, a time interval for refreshing a news list.

In the above Step S15 of the present application, the pre-set time threshold is read, and the time threshold and the refreshing start time form a time interval. Through the above time interval, the news, the publication time of which falls within the time interval is filtered. The time interval described here can also be referred to as a time window.

In practice, taking the news client running on the touchscreen mobile phone as an example, any time point can be set as the refreshing start time. The refreshing start time is selected according to the refreshing strategy or refreshing algorithm. For example, in the present embodiment, when the latest news is refreshed, the current time may be set as the refreshing start time. When the historical news is refreshed, the recommending time for the last piece of news that has been refreshed in the historical news list may be set as the refreshing start time.

Step S17: A recommended news list is acquired according to the refreshing start time and the time threshold, the recommended news list including: at least one piece of news to be recommended, the publication time of the news to be recommended falls within the time interval.

In the above Step S17 of the present application, the recommended news list is acquired according to the time interval formed by the refreshing start time and the time threshold.

In practice, taking the news client running on the touch-screen mobile phone as an example, the time threshold may be set according to the user's own preferences. If the time threshold is set to be smaller, the news closer to the current time range will be refreshed in each refreshing. However, if the time threshold is set to be too small, the amount of news that can be refreshed will be very small. The time threshold may also be set to a default value, which can be 24 hours.

Step S19: A recommending time is allocated for each piece of news to be recommended in the recommended news list.

In the above Step S19 of the present application, each piece of news has a time attribute, and the time attribute records the publication time of the piece of news. Here, in addition to the publication time, the recommending time attribute is set for each piece of news.

In practice, taking the news client running on the touch-screen mobile phone as an example, there are a number of ways to set the recommending time for each piece of news. Herein the news in the recommended news list can be sorted according to the time first, and the recommending time is allocated successively for each piece of news in the news list. It is also possible to weight the respective piece of news in the recommended news list according to the browsing habits or the degree of preference for the news type of users, and to allocate the recommending time for each piece of news according to the weight value acquired by weighting.

Step S21: The news to be recommended in the recommended news list is refreshed according to the recommended time to generate a new recommended news list.

In the above Step S21 of the present application, each piece of news to be recommended in the recommended news list is sorted in a positive or inverted order in the order of the recommending time.

Specifically, through Step S11 to Step S21, the refreshing of the news is triggered according to the judgment of the refreshing signal. In the process of acquiring the news list, the recommending time attribute is re-added for each piece of news. A newly allocated recommended list is generated by allocating the recommending time for each piece of news and in the order of the recommending time.

Figure 3:
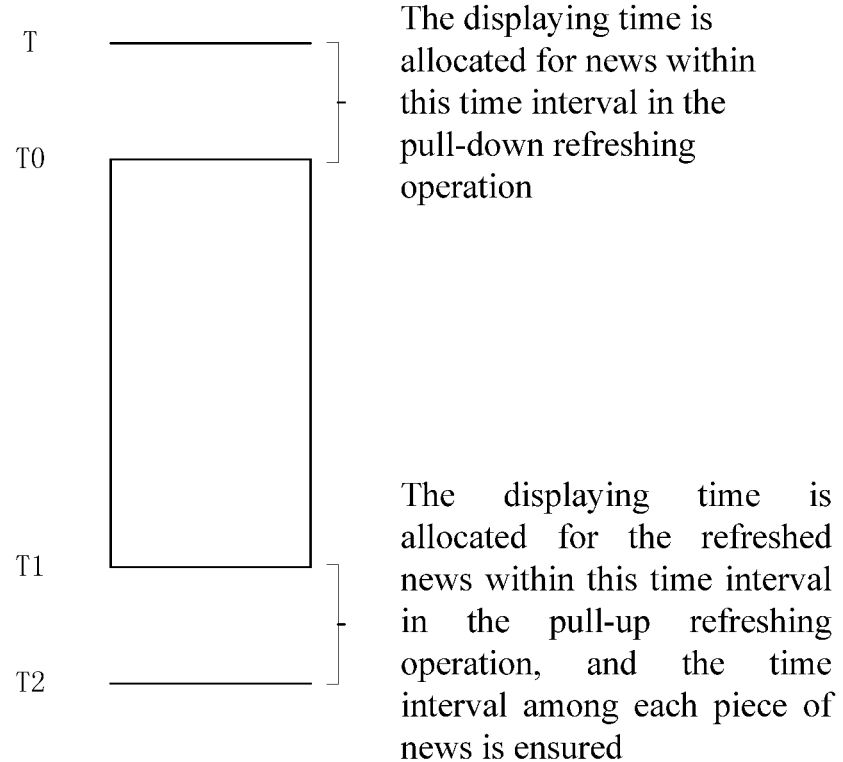
FIG. 3 is a schematic diagram of an allocation of a mobile news client for news displaying time according to an embodiment of the disclosure.

In practice, taking the news client running on the touch-screen mobile phone as an example, FIG. 3 intuitively describes the strategy displaying the time allocation, where T represents the current system time, T0 represents the time of displaying the latest news in the current list, T1 represents the time of displaying the oldest piece of news in the current list, and T2 represents the time of displaying the latest news in the last refreshing history. For example, if the current list is refreshed at 9:00 am, the last piece of news therein displays 7:00 am, and the last refreshing is at 8:00 last night, T0, T1, T2 are 9:00 am, 7:00 am, and 8:00 last night.

Specifically, the news personalized sorting method is as follows.

Step A: The news does not display the real publication time in the client, but displays the time set in the server.

Step B: Each time the user refreshes the news list, the client calculates a time window according to the action type of users and the time of the last piece of news of the current list. The time window herein is the time interval proposed in the claim, wherein the action type is divided into a pull-down action form top to down and a pull-up action from bottom to up.

Step C: Given a time window, the news recommendation service recommends several pieces of news published within a specific time window for a user and filters out the news that the user has ever refreshed.

Step D: The server allocates a recommending time to each piece of recommended news according to the amount of news acquired by refreshing and the start and end time of the time window. This recommending time is valid only for the current user and recorded on the server.

Step E: The client sorts the news according to the recommending time for the new recommended news and displays the recommending time for the news.

Step F: Because the news that can be recommended each time the user refreshes the system is not necessarily published after the last refreshing, if the time window is large enough (such as 1 day, at least tens of thousands of pieces of news every day), this news sorting method can acquire the product effect of unlimitedly refreshing.

In the above steps, how to allocate the displaying time of the recommended news is a key link of the embodiments of the disclosure. It can be ensured that the news sorting list appears to be sorted in a chronological order and the recommendable news is not wasted as far as possible in the pull-up refreshing only by allocating the displaying time. The recommendable news herein is the news acquired via a refreshing operation.

For each user, the time of each piece of news in the client seen by a user in the list is the time set by the recommendation service rather than the publication time of news. This time is related to the time when the user refreshes this piece of news. In this sense, this time is personalized.

The above embodiment of the disclosure proposes a personalized sorting method of supporting the unlimitedly refreshing, which can ensure that the user thinks in the sense of perception that the news sorting follows the chronological order while minimizing the missing of wonderful news that the user may be interested in.

In summary, the embodiments of the disclosure solves the problem in the traditional art that more pieces of news cannot be refreshed via a refreshing operation due to the fact that a news client sorts news according to the publication time of the news. The effect is achieved that all the news during that day can be refreshed only via a refreshing operation.

Preferably, in an alternative embodiment provided by the present application, the refreshing signal includes at least one of: a first touch-sensitive signal generated by sliding down on a touch screen and a second touch-sensitive signal generated by sliding up on the touch screen.

Specifically, the refreshing signal can be set. The touch-sensitive signal generated by sliding down on the screen is set as the first touch-sensitive signal for refreshing the latest news. The touch-sensitive signal generated by sliding up on the screen is set as the second touch-sensitive signal for refreshing the historical news.

In practice, taking the news client running on the touch-screen mobile phone as an example, the refreshing signal can also be generated in many forms. For example, the touch-sensitive signal generated by clicking on a region of the screen can be defined as a refreshing signal. The level signal generated by an entity key on the body of a mobile phone can also be defined as a refreshing signal. When the volume increasing key is pressed, the latest news is refreshed. When the volume reducing key is pressed, the historical news is refreshed.

Preferably, in an alternative embodiment provided by the present application, when the received refreshing signal is the first touch-sensitive signal, the refreshing start time is the current system time. The step of acquiring a recommended news list according to the refreshing start time and the time threshold in the above Step S17 includes the following steps.

Step S171a: The amount n of news of a first news set contained in the recommended news list is acquired according to the first touch-sensitive signal, where n is a natural number.

Step S173a: The current system time and a preset first time threshold are acquired.

Step S175a: A first time interval for restricting a time interval for refreshing a first recommended news list is determined according to the current system time and the first time threshold.

Step S177a: n pieces of the news, the publication time of which falls within the first time interval, is acquired according to the first time interval.

Step S179a: The first recommended news list is generated according to the acquired n pieces of the news.

Specifically, through Step S171a to Step S179a, it is possible to pre-set the news item in each refreshing with a value n. In a case that the first touch-sensitive signal generated by sliding down on the screen is received, the step of refreshing the latest news is started. In a case that the latest news is refreshed, the current system time is acquired as the refreshing start time. The first time interval for refreshing the news publication time is determined according to the current system time and the pre-set first time threshold, and the first time interval may be referred to as a time window. The n pieces of news published in the first time interval are acquired according to the first time interval, and the first recommended news list is generated.

In practice, taking the news client running on the touch-screen mobile phone as an example, as shown in FIG. 3, given the last refreshing time T of user A and user B, it is believed that in addition to the news which is newly published after the time T, the news which is published before the time T but has not been seen by A still has a recommended value. However, given the timeliness of news, very old news cannot be recommended, so we need to set a time window limit, such as 24 hours. If the user performs a drop-down refreshing from top to bottom on the screen, the demand of the user at this time is to see a new piece of news, so that the starting time of our time window is the current system time. That is, only the news within 24 hours is recommended.

Preferably, in an alternative embodiment provided by the present application, the step of allocating a recommending time for each piece of news to be recommended in the recommended news list in Step S19 includes the following steps.

Step S191a: The first touch-sensitive signal which is previously received and a previous refreshing time of refreshing the news list are acquired.

Step S193a: A second time interval for restricting a recommending time for the news in the first recommended list is determined according to the previous refreshing time and the current system time.

Step S195a: The recommending time is allocated for each piece of the news in the first recommended list according to the second time interval, wherein the recommending time falls within the second time interval.

Specifically, in Step S191a to Step S195a, the second time interval is confirmed according to the previous refreshing time and the current time, and the second time interval is used to define the value range of the recommending time set for each piece of news. According to this second time interval, the recommending time is allocated for each piece of news.

In practice, taking the news client running on the touch-screen mobile phone as an example, as shown in FIG. 3, in the case of the drop-down refreshing, the displaying time T0 of the latest news in the list before the refreshing needs to be acquired first, and then each piece of newly recommended news is allocated a time between T0 and the current time T and is sorted according to this time.

Preferably, in an alternative embodiment provided by the present application, the step of allocating the recommending time for each piece of the news in the first recommended list according to the second time interval in Step S195a includes the following steps.

Step S1951a: The second time interval evenly is allocated according to the amount n of news in the first recommended news list and the second time interval to acquire a first equal time interval of each piece of the news in the recommended news list.

Step S1953a: The recommending time is allocated for each piece of the news within the first recommended list according to the first equal time interval and the current system time.

Specifically, in Step S1951a to Step S1953a, the second time interval may be divided into several first equal time intervals evenly according to the amount n of news in the recommended news list. Each piece of news within the first recommended list is allocated a recommending time according to the order of the publication time and the first equal time interval.

In practice, taking the news client running on the touch-screen mobile phone as an example, in addition to allocating the recommending time for news in the form of the above equal time interval, a random variable can also be introduced in order to make the recommending time look more real. Each piece of news is allocated a randomly recommending time within the second time interval using a random variable.

In addition to this, it is also possible to weight the respective piece of news in the recommended list according to the personalized information such as the news browsing habits and the type of news of interest of each user to determine the weight value of each piece of news for the user. The recommended list is pre-sorted according to the weight value. And then, a recommending time value is allocated to each piece of news in the pre-sorted recommended list using the above method for allocating the recommending time, so that the news that users are interested in can be first refreshed.

Preferably, in an alternative embodiment provided by the present application, in a case that the received refreshing signal is the second touch-sensitive signal, the refreshing start time is the recommending time for the last piece of news that has been refreshed, wherein the step of acquiring a recommended news list according to the refreshing start time and the time threshold in the above Step S17 includes the following steps.

Step S171*b*: The amount m of news of a second news set contained in the recommended news list is acquired according to the second touch-sensitive signal, where m is an integer.

Step S173*b*: The recommending time for the last piece of news that has been refreshed and a second time threshold are acquired.

Step S175*b*: A third time interval for restricting a time interval for refreshing a second recommended news list is determined according to the recommending time for the last piece of news that has been refreshed and the second time threshold.

Step S177*b*: m pieces of the news, the publication time of which falls within the third time interval, are acquired according to the third time interval.

Step S179*b*: The second recommended news list is generated according to the acquired m pieces of the news.

Specifically, through Step S171*b* to Step S179*b*, it is possible to pre-set the news item in each refreshing with a value n. In a case that the second touch-sensitive signal generated by sliding up on the screen is received, the step of refreshing the historical news is started. In a case that the historical news is refreshed, the recommending time for the last piece of news that has been refreshed is acquired as the refreshing start time. The third time interval for refreshing the news publication time is determined according to the recommending time for the last piece of news that has been refreshed and the pre-set second time threshold, and the third time interval may be referred to as a time window. m pieces of news published in the third time interval are acquired according to the third time interval, and the second recommended news list is generated.

In practice, taking the news client running on the touch-screen mobile phone as an example, as shown in FIG. 3, when a user pulls up the list from bottom to top, the system displays his/her refreshing history preferentially, but when there is a certain time interval between his/her two refreshing histories, when the user slides up to the end of the latest refresh history, the user needs to refresh some news rather than jump directly to the older history. It is believed that if the user performs a pull-up refreshing, the demand of the user at this time becomes a look at interesting old news between two refreshing histories. At this time, the start time of the time window should be calculated from the displaying time of the oldest piece of news of the latest refreshing history between two refreshing histories. The displaying time herein is not the real news publication time, but the news recommending time.

Preferably, in an alternative embodiment provided by the present application, the step of allocating a recommending time for each piece of news to be recommended in the recommended news list in Step S19 includes the following steps.

Step S191*b*: The recommending time for the last piece of news that has been refreshed and a third time threshold are acquired.

Step S193*b*: A fourth time interval for restricting a recommending time for the news in the second recommended list is determined according to the recommending time for the last piece of news that has been refreshed and the third time threshold.

Step S195*b*: The recommending time is allocated for each piece of the news in the second recommended list according to the fourth time interval, wherein the recommending time falls within the fourth time interval.

Specifically, in Step S191*b* to Step S195*b*, the recommending time is allocated for each piece of the news in the second recommended list according to the fourth time interval. Here, the fourth time interval is used to define the recommending time allocated to the refreshed historical news.

In practice, taking the news client running on the touch-screen mobile phone as an example, as shown in FIG. 3, the maximum value of the displaying time is the displaying time of the oldest piece of news in the current history list, but the minimum value cannot simply correspond to the time of previously refreshing the latest news. This is because the amount of news recommended every time is limited (assuming 15). If the displaying time of the 15 pieces of news has filled the refreshing time interval of two refreshing histories, the next pull-down refreshing of a user can only display the old refreshing history, but cannot take this opportunity to recommend more news. Therefore, in general, we will start from the maximum value, and take a fixed time interval, such as 10 minutes. The displaying time of each piece of news is equal to the displaying time of the previous piece of news minus 10 minutes. In other words, assuming that the displaying time of the oldest news in the current list is T1, the displaying time of the i-th recommended news is T−i*t, where t is a fixed interval, which can be 10 minutes. The displaying time of the news in the recommended news has been less than the latest news in the previous refreshing.

Figure 4:
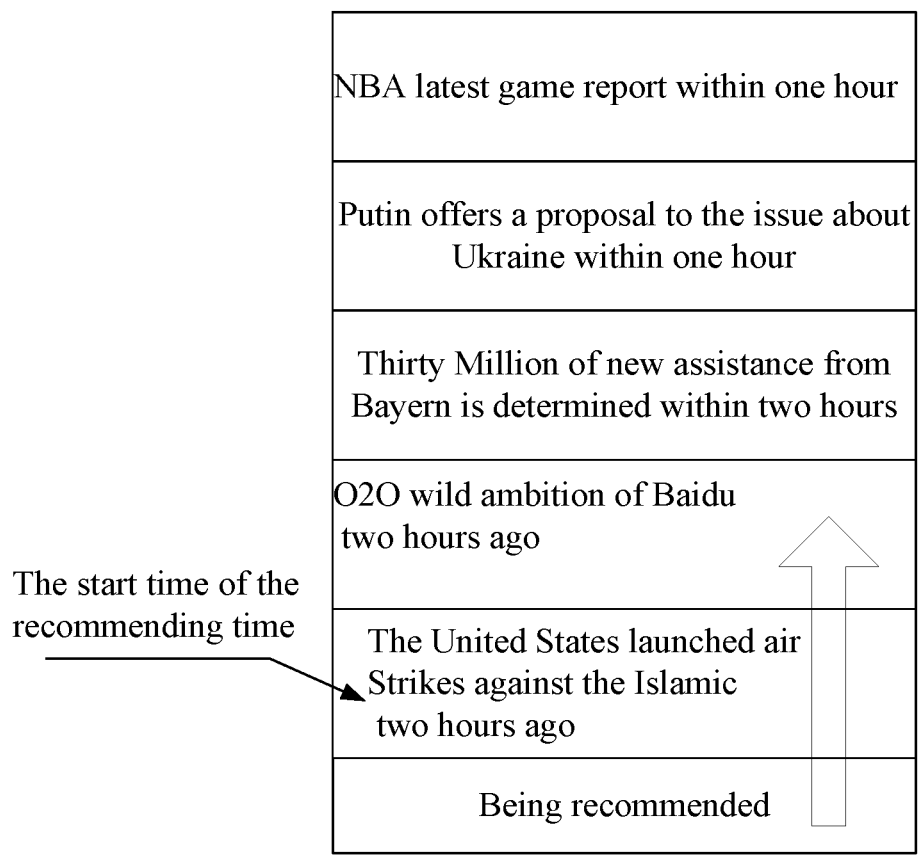
FIG. 4 is a schematic diagram of an interface of bottom-up refreshing of a mobile news client according to an embodiment of the disclosure.

As shown in FIG. 4, if the list in which the maximum time interval is 1 hour is the current list of a user, and the last refreshing of the user is the last night, the system will recommend older news when the user pulls up the list. We take the time of the oldest piece of news in the current list as the start time of the recommending time window. Assuming that the length of the time window is 24 hours, it means that we can recommend news from 2 hours to 26 hours ago.

Preferably, in an alternative embodiment provided by the present application, the step of allocating the recommending time for each piece of the news in the second recommended list according to the fourth time interval in Step S191*b* includes the following steps.

Step S1911*b*: The fourth time interval evenly is allocated according to the amount m of news in the second recommended news list and the fourth time interval to acquire a second equal time interval of each piece of the news in the recommended news list.

Step S1913*b*: The recommending time is allocated for each piece of the news within the second recommended list according to the second equal time interval and the recommending time for the last piece of news that has been refreshed.

Specifically, in Step S1911*b* to Step S1913*b*, the fourth time interval may be divided into several second equal time intervals evenly according to the amount m of news in the recommended news list. Each piece of news within the second recommended list is allocated a recommending time according to the order of the publication time and the second equal time interval.

In practice, taking the news client running on the touch-screen mobile phone as an example, in addition to allocating the recommending time for news in the form of the above equal time interval, a random variable can also be introduced in order to make the recommending time look more real. Each piece of news is allocated a randomly recommending time within the fourth time interval using a random variable.

In addition to this, it is also possible to weight the respective piece of news in the recommended list according to the personalized information such as the news browsing habits and the type of news of interest of each user to determine the weight value of each piece of news for the user. The recommended list is pre-sorted according to the weight value. And then, a recommending time value is allocated to each piece of news in the pre-sorted recommended list using the above method for allocating the recommending time. According to the different refreshing ways, the news in different time intervals that the user is most likely to be interested in is refreshed preferentially. In this way, the news that the user is most likely to be interested in can be recommended for users as much as possible.

Figure 5:
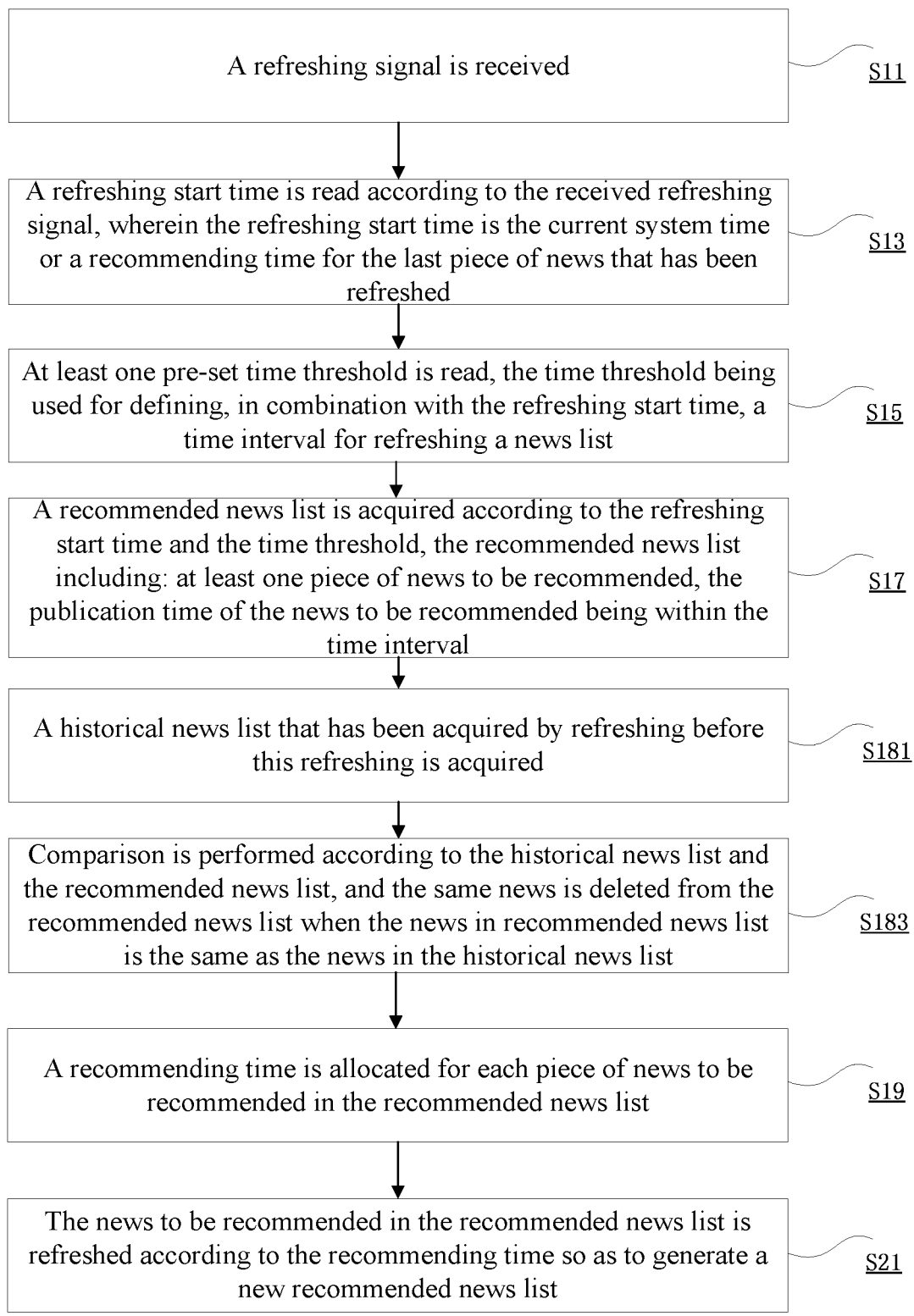
FIG. 5 is a flow diagram of an alternative method for refreshing a news list according to a first embodiment of the disclosure.

Preferably, as shown in FIG. 5, in the alternative embodiment provided by the present application, prior to allocating a recommending time for each piece of news to be recommended in the recommended news list in Step S19, it is also possible to perform the following steps.

Step S181: A historical news list that has been acquired by refreshing before instant refreshing is acquired.

Step S183: Comparison is performed according to the historical news list and the recommended news list, and the same news is deleted from the recommended news list when the news in recommended news list is the same as the news in the historical news list.

Specifically, in Step S181 to Step S183, comparison is performed according to the historical news list and the recommended news list, and the same news in the recommended news list and the historical news list is deleted so as to prevent the same news from being repeatedly refreshed.

In practice, taking the news client running on the touch-screen mobile phone as an example, through a given time interval, the recommendation service first finds several pieces of news that a user may be interested in according to some algorithm, and then needs to find out and filter out the news which has been displayed to the user therefrom, because this part of news should not be displayed again to the user. This step can be referred to as recommendation removing repetition. In general, the recommendation service will store the browsing histories of all users in a memory-based high-performance cache service (such as Memory Cache) so as to be able to quickly access.

In summary, the main advantage of the embodiments of the disclosure is that it satisfies the perceived demand of a user for sorting news in a chronological order without restricting the chance of recommending good news due to the sorting, which can provide the user experience of supporting the infinite refreshing. It also distinguishes the refresh demands of two different types, that is, pull-up refreshing and pull-down refreshing.

Embodiment 2

Figure 6:
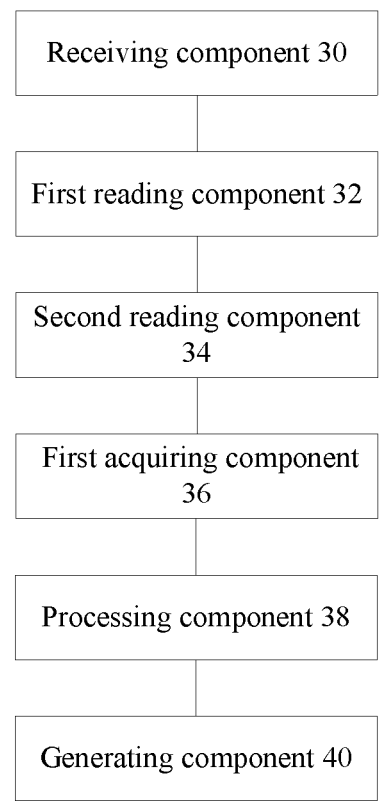
FIG. 6 is a structure schematic diagram of a device for refreshing a news list according to a second embodiment of the disclosure.
Figure 7:
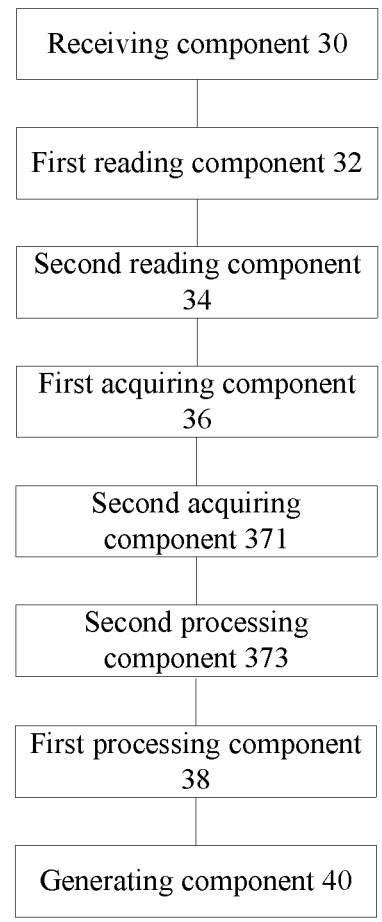
FIG. 7 is a structure schematic diagram of an alternative device for refreshing a news list according to a second embodiment of the disclosure.

The embodiment of the disclosure further provides a device for refreshing a news list. As shown in FIG. 6, the device includes a receiving component 30, a first reading component 32, a second reading component 34, a first acquiring component 36, a processing component 38 and a generating component 40.

Herein the receiving component 30 is configured to receive a refreshing signal.

In the above receiving component 30 of the present application, the refreshing process is triggered by receiving the refreshing signal, and the refreshing function of the news list is realized.

In practice, taking the news client running on the touch-screen mobile phone as an example, the above refreshing signal may be a signal generated by dragging a region of the page, or may be a signal generated by clicking a region on the screen, or may be a refreshing signal automatically generated by the system by setting the refreshing time for the system.

The first reading component 32 is configured to read arefreshing start time according to the received refreshing signal, wherein the refreshing start time is the current system time or a recommending time for the last piece of news that has been refreshed.

In the above first reading component 32 of the present application, the refreshing type is judged according to the received refreshing signal. The refreshing start time corresponding to the refreshing type is recorded according to different refreshing types.

In practice, taking the news client running on the touch-screen mobile phone as an example, the refreshing type can be divided into two types, that is, refreshing the latest news and refreshing the historical news. The refreshing start time corresponding to the refreshing type is read recorded according to different refreshing types, respectively.

The second reading component 34 is configured to read at least one pre-set time threshold, the time threshold is used for defining, in combination with the refreshing start time, a time interval for refreshing a news list.

In the above second reading component 34 of the present application, the pre-set time threshold is read, and the time threshold and the refreshing start time form a time interval. Through the above time interval, the news, the publication time of which falls within the time interval is filtered. The time interval described here can also be referred to as a time window.

In practice, taking the news client running on the touch-screen mobile phone as an example, any time point can be set as the refreshing start time. The refreshing start time is selected according to the refreshing strategy or refreshing algorithm. For example, in the present embodiment, when the latest news is refreshed, the current time may be set as the refreshing start time. When the historical news is refreshed, the recommending time for the last piece of news that has been refreshed in the historical news list may be set as the refreshing start time.

The first acquiring component 36 is configured to acquire a recommended news list according to the refreshing start time and the time threshold, the recommended news list including: at least one piece of news to be recommended, the publication time of the news to be recommended falls within the time interval.

In the above first acquiring component 36 of the present application, the recommended news list is acquired according to the time interval formed by the refreshing start time and the time threshold.

In practice, taking the news client running on the touch-screen mobile phone as an example, the time threshold may be set according to the user's own preferences. If the time threshold is set to be smaller, the news closer to the current time range will be refreshed in each refreshing. However, if the time threshold is set to be too small, the amount of news that can be refreshed will be very small. The time threshold may also be set to a default value, which can be 24 hours.

The first processing component 38 is configured to allocate a recommending time for each piece of news to be recommended in the recommended news list.

In the above first processing component 38 of the present application, each piece of news has a time attribute, and the time attribute records the publication time of the piece of news. Here, in addition to the publication time, the recommending time attribute is set for each piece of news.

In practice, taking the news client running on the touch-screen mobile phone as an example, there are a number of ways to set the recommending time for each piece of news. Herein the news in the recommended news list can be sorted according to the time first, and the recommending time is allocated successively for each piece of news in the news list. It is also possible to weight the respective piece of news in the recommended news list according to the browsing habits or the degree of preference for the news type of users, and to allocate the recommending time for each piece of news according to the weight value acquired by weighting.

The generating component 40 is configured to refresh the news to be recommended in the recommended news list according to the recommended time to generate a new recommended news list.

In the above generating component 40 of the present application, each piece of news to be recommended in the recommended news list is sorted in a positive or inverted order in the order of the recommending time.

Specifically, through the receiving component 30, the first read component 32, the second read component 34, the first acquiring component 36, the first processing component 38, and the generating component 40, the refreshing of the news is triggered according to the judgment of the refreshing signal. In the process of acquiring the news list, the recommending time attribute is re-added for each piece of news. A newly allocated recommended list is generated by allocating the recommending time for each piece of news and in the order of the recommending time.

In practice, taking the news client running on the touch-screen mobile phone as an example, FIG. 3 intuitively describes the strategy displaying the time allocation, where T represents the current system time, T0 represents the time of displaying the latest news in the current list, T1 represents the time of displaying the oldest piece of news in the current list, and T2 represents the time of displaying the latest news in the last refreshing history. For example, if the current list is refreshed at 9:00 am, the last piece of news therein displays 7:00 am, and the last refreshing is at 8:00 last night, T0, T1, T2 are 9:00 am, 7:00 am, and 8:00 last night.

Specifically, the news personalized sorting method is as follows.

Step A: The news does not display the real publication time in the client, but displays the time set in the server.

Step B: Each time the user refreshes the news list, the client calculates a time window according to the action type of users and the time of the last piece of news of the current list. The time window herein is the time interval proposed in the claim, wherein the action type is divided into a pull-down action form top to down and a pull-up action from bottom to up.

Step C: Given a time window, the news recommendation service recommends several pieces of news published within a specific time window for a user and filters out the news that the user has ever refreshed.

Step D: The server allocates a recommending time to each piece of recommended news according to the amount of news acquired by refreshing and the start and end time of the time window. This recommending time is valid only for the current user and recorded on the server.

Step E: The client sorts the news according to the recommending time for the new recommended news and displays the recommending time for the news.

Step F: Because the news that can be recommended each time the user refreshes the system is not necessarily published after the last refreshing, if the time window is large enough (such as 1 day, at least tens of thousands of pieces of news every day), this news sorting method can acquire the product effect of unlimitedly refreshing.

In the above steps, how to allocate the displaying time of the recommended news is a key link of the embodiments of the disclosure. It can be ensured that the news sorting list appears to be sorted in a chronological order and the recommendable news is not wasted as far as possible in the pull-up refreshing only by allocating the displaying time. The recommendable news herein is the news acquired via a refreshing operation.

For each user, the time of each piece of news in the client seen by a user in the list is the time set by the recommendation service rather than the publication time of news. This time is related to the time when the user refreshes this piece of news. In this sense, this time is personalized.

The above embodiment of the disclosure proposes a personalized sorting method of supporting the unlimitedly refreshing, which can ensure that the user thinks in the sense of perception that the news sorting follows the chronological order while minimizing the missing of wonderful news that the user may be interested in.

In an embodiment provided by the present application, the refreshing signal includes at least one of: a first touch-sensitive signal generated by sliding down on a touch screen and a second touch-sensitive signal generated by sliding up on the touch screen.

Specifically, the refreshing signal can be set. The touch-sensitive signal generated by sliding down on the screen is set as the first touch-sensitive signal for refreshing the latest news. The touch-sensitive signal generated by sliding up on the screen is set as the second touch-sensitive signal for refreshing the historical news.

In practice, taking the news client running on the touch-screen mobile phone as an example, the refreshing signal can also be generated in many forms. For example, the touch-sensitive signal generated by clicking on a region of the screen can be defined as a refreshing signal. The level signal generated by an entity key on the body of a mobile phone can also be defined as a refreshing signal. When the volume increasing key is pressed, the latest news is refreshed. When the volume reducing key is pressed, the historical news is refreshed.

Preferably, in an alternative embodiment provided by the present application, when the received refreshing signal is the first touch-sensitive signal generated by sliding down on a touch screen, the refreshing start time is the current system time, wherein the first acquiring component 36 includes: a first acquiring sub-component 3611, a second acquiring sub-component 3613, a first determining sub-component 3615, a third acquiring sub-component 3617, and a first generating sub-component 3619.

Herein the first acquiring sub-component 3611 is configured to acquire the amount n of news of a first news set contained in the recommended news list according to the first touch-sensitive signal.

The second acquiring sub-component 3613 is configured to acquire the current system time and a preset first time threshold.

The first determining sub-component 3615 is configured to determine a first time interval for restricting a time interval for refreshing a first recommended news list according to the current system time and the first time threshold.

The third acquiring sub-component 3617 is configured to acquire n pieces of the news, the publication time of which falls within the first time interval, according to the first time interval.

The first generating sub-component 3619 is configured to generate the first recommended news list according to the acquired n pieces of the news.

Specifically, through the first acquiring sub-component 3611, the second acquiring sub-component 3613, the first determining sub-component 3651, the third acquiring sub-component 3617, and the first generating sub-component 3619, it is possible to pre-set the news item in each refreshing with a value n. When the first touch-sensitive signal generated by sliding down on the screen is received, the step of refreshing the latest news is started. When the latest news is refreshed, the current system time is acquired as the refreshing start time. The first time interval for refreshing the news publication time is determined according to the current system time and the pre-set first time threshold, and the first time interval may be referred to as a time window. The n pieces of news published in the first time interval are acquired according to the first time interval, and the first recommended news list is generated.

In practice, taking the news client running on the touch-screen mobile phone as an example, as shown in FIG. 3, given the last refreshing time T of user A and user B, it is believed that in addition to the news which is newly published after the time T, the news which is published before the time T but has not been seen by A still has a recommended value. However, given the timeliness of news, very old news cannot be recommended, so we need to set a time window limit, such as 24 hours. If the user performs a drop-down refreshing from top to bottom on the screen, the demand of the user at this time is to see a new piece of news, so that the starting time of our time window is the current system time. That is, only the news within 24 hours is recommended.

Preferably, in an alternative embodiment provided by the present application, the first processing component 38 includes a fourth acquiring sub-component 3811, a second determining sub-component 3813, and a first allocating component 3815.

Herein the fourth acquiring sub-component 3811 is configured to acquire the first touch-sensitive signal which is previously received and a previous refreshing time of refreshing the news list.

The second determining sub-component 3813 is configured to determine a second time interval for restricting a recommending time for the news in the first recommended list according to the previous refreshing time and the current system time.

The first allocating component 3815 is configured to allocate the recommending time for each piece of the news in the first recommended list according to the second time interval, wherein the recommending time falls within the second time interval.

Specifically, in the fourth acquiring sub-component 3811, the second determining sub-component 3813, and the first allocating component 3815, the second time interval is confirmed according to the previous refreshing time and the current time, and the second time interval is used to define the value range of the recommending time set for each piece of news. According to this second time interval, the recommending time is allocated for each piece of news.

In practice, taking the news client running on the touch-screen mobile phone as an example, in the case of the drop-down refreshing, the displaying time T0 of the latest news in the list before the refreshing needs to be acquired first, and then each piece of newly recommended news is allocated a time between T0 and the current time T and is sorted according to this time.

Preferably, in an alternative embodiment provided by the present application, the first allocating component 3815 includes a first processing sub-component 38151 and a first allocating sub-component 38153.

The first processing sub-component 38151 is configured to allocate the second time interval evenly according to the amount n of news in the first recommended news list and the second time interval to acquire a first equal time interval of each piece of the news in the recommended news list.

The first allocating sub-component 38153 is configured to allocate the recommending time for each piece of the news within the first recommended list according to the first equal time interval and the current system time.

Specifically, in the first processing sub-component 38151 and the first allocating sub-component 38153, the second time interval may be divided into several first equal time intervals evenly according to the amount n of news in the recommended news list. Each piece of news within the first recommended list is allocated a recommending time according to the order of the publication time and the first equal time interval.

In practice, taking the news client running on the touch-screen mobile phone as an example, in addition to allocating the recommending time for news in the form of the above equal time interval, a random variable can also be introduced in order to make the recommending time look more real. Each piece of news is allocated a randomly recommending time within the second time interval using a random variable.

In addition to this, it is also possible to weight the respective piece of news in the recommended list according to the personalized information such as the news browsing habits and the type of news of interest of each user to determine the weight value of each piece of news for the user. The recommended list is pre-sorted according to the weight value. And then, a recommending time value is allocated to each piece of news in the pre-sorted recommended list using the above method for allocating the recommending time. According to the different refreshing ways, the news in different time intervals that the user is most likely to be interested in is refreshed preferentially. In this way, the news that the user is most likely to be interested in can be recommended for users as much as possible.

Preferably, in an alternative embodiment provided by the present application, when the received refreshing signal is a second touch-sensitive signal generated by sliding up on the touch screen, the refreshing start time is the recommending time for the last piece of news that has been refreshed, wherein the first acquiring component 36 further includes a fifth acquiring sub-component 3621, a sixth acquiring sub-component 3623, a third determining sub-component 3625, a seventh acquiring sub-component 3627, and a second generating sub-component 3629.

Herein the fifth acquiring sub-component 3621 is configured to acquire the amount m of news of a second news set contained in the recommended news list according to the second touch-sensitive signal.

The sixth acquiring sub-component 3623 is configured to acquire the recommending time for the last piece of news that has been refreshed and a second time threshold.

The third determining sub-component 3625 is configured to determine a third time interval for restricting a time interval for refreshing a second recommended news list according to the recommending time for the last piece of news that has been refreshed and the second time threshold.

The seventh acquiring sub-component 3627 is configured to acquire m pieces of the news, the publication time of which falls within the third time interval, according to the third time interval.

The second generating sub-component 3629 is configured to generate the second recommended news list according to the acquired m pieces of the news.

Specifically, through the fifth acquiring sub-component 3621, the sixth acquiring sub-component 3623, the third determining sub-component 3625, the seventh acquiring sub-component 3627, and the second generating sub-component 3629, it is possible to pre-set the news item in each refreshing with a value n. When the second touch-sensitive signal generated by sliding up on the screen is received, the step of refreshing the historical news is started. When the historical news is refreshed, the recommending time for the last piece of news that has been refreshed is acquired as the refreshing start time. The third time interval for refreshing the news publication time is determined according to the recommending time for the last piece of news that has been refreshed and the pre-set second time threshold, and the third time interval may be referred to as a time window. m pieces of news published in the third time interval are acquired according to the third time interval, and the second recommended news list is generated.

In practice, taking the news client running on the touch-screen mobile phone as an example, when a user pulls up the list from bottom to top, the system displays his/her refreshing history preferentially, but when there is a certain time interval between his/her two refreshing histories, when the user slides up to the end of the latest refresh history, the user needs to refresh some news rather than jump directly to the older history. It is believed that if the user performs a pull-up refreshing, the demand of the user at this time becomes a look at interesting old news between two refreshing histories. At this time, the start time of the time window should be calculated from the displaying time of the oldest piece of news of the latest refreshing history between two refreshing histories. The displaying time herein is not the real news publication time, but the news recommending time.

Preferably, in an alternative embodiment provided by the present application, the first processing component 38 further includes an eighth acquiring component 3821, a fourth determining sub-component 3823, and a second allocating component 3825.

Herein the eighth acquiring component 3821 is configured to acquire the recommending time for the last piece of news that has been refreshed and a third time threshold.

The fourth determining sub-component 3823 is configured to determine a fourth time interval for restricting a recommending time for the news in the second recommended list according to the recommending time for the last piece of news that has been refreshed and the third time threshold.

The second allocating component 3825 is configured to allocate the recommending time for each piece of the news in the second recommended list according to the fourth time interval, wherein the recommending time falls within the fourth time interval.

Specifically, the first processing component 38 includes the eighth acquiring component 3821, the fourth determining sub-component 3823, and the second allocating component 3825. The recommending time is allocated for each piece of the news in the second recommended list according to the fourth time interval. The fourth time interval is used to define the recommending time allocated to the refreshed historical news.

In practice, taking the news client running on the touch-screen mobile phone as an example, as shown in FIG. 3, the maximum value of the displaying time is the displaying time of the oldest piece of news in the current history list, but the minimum value cannot simply correspond to the time of previously refreshing the latest news. This is because the amount of news recommended every time is limited (assuming 15). If the displaying time of the 15 pieces of news has filled the refreshing time interval of two refreshing histories, the next pull-down refreshing of a user can only display the old refreshing history, but cannot take this opportunity to recommend more news. Therefore, in general, we will start from the maximum value, and take a fixed time interval, such as 10 minutes. The displaying time of each piece of news is equal to the displaying time of the previous piece of news minus 10 minutes. In other words, assuming that the displaying time of the oldest news in the current list is T1, the displaying time of the i-th recommended news is $T-i*t$, where t is a fixed interval, which can be 10 minutes. The displaying time of the news in the recommended news has been less than the latest news in the previous refreshing.

As shown in FIG. 4, if the list in which the maximum time interval is 1 hour is the current list of a user, and the last refreshing of the user is the last night, the system will recommend older news when the user pulls up the list. We take the time of the oldest piece of news in the current list as the start time of the recommending time window. Assuming that the length of the time window is 24 hours, it means that we can recommend news from 2 hours to 26 hours ago.

Preferably, in an alternative embodiment provided by the present application, the second allocating component 3825 includes a second processing sub-component 38251 and a second allocating sub-component 38253.

Herein the second processing sub-component 38251 is configured to allocate the fourth time interval evenly according to the amount m of news in the second recommended news list and the fourth time interval to acquire a second equal time interval of each piece of the news in the recommended news list.

The second allocating sub-component 38253 is configured to allocate the recommending time for each piece of the news within the second recommended list according to the second equal time interval and the recommending time for the last piece of news that has been refreshed.

Specifically, in the second processing sub-component 38251 and the second allocating sub-component 38253, the fourth time interval may be divided into several second equal time intervals evenly according to the amount m of news in the recommended news list. Each piece of news within the second recommended list is allocated a recommending time according to the order of the publication time and the second equal time interval.

In practice, taking the news client running on the touch-screen mobile phone as an example, in addition to allocating the recommending time for news in the form of the above equal time interval, a random variable can also be introduced in order to make the recommending time look more real. Each piece of news is allocated a randomly recommending time within the fourth time interval using a random variable.

In addition to this, it is also possible to weight the respective piece of news in the recommended list according to the personalized information such as the news browsing habits and the type of news of interest of each user to determine the weight value of each piece of news for the user. The recommended list is pre-sorted according to the weight value. And then, a recommending time value is allocated to each piece of news in the pre-sorted recommended list using the above method for allocating the recommending time, so that the news that users are not interested in is first preferentially refreshed when refreshing the historical news. In this way, it can be ensured that the news that users are interested in is preferentially refreshed when refreshing the latest news.

Preferably, as shown in FIG. 5, in the alternative embodiment provided by the present application, the device further includes a second acquiring component 371 and a second processing component 373.

Herein the second acquiring 371 is configured to acquire a historical news list that has been acquired by refreshing before instant refreshing.

The second processing component 373 is configured to compare according to the historical news list and the recommended news list, and deleting the same news from the recommended news list when the news in recommended news list is the same as the news in the historical news list.

Specifically, in the second acquiring component 371 and the second processing component 373, comparison is performed according to the historical news list and the recommended news list, and the same news in the recommended news list and the historical news list is deleted so as to prevent the same news from being repeatedly refreshed.

In practice, taking the news client running on the touchscreen mobile phone as an example, through a given time interval, the recommendation service first finds several pieces of news that a user may be interested in according to some algorithm, and then needs to find out and filter out the news which has been displayed to the user therefrom, because this part of news should not be displayed again to the user. This step can be referred to as recommendation removing repetition. In general, the recommendation service will store the browsing histories of all users in a memory-based high-performance cache service (such as Memory Cache) so as to be able to quickly access.

In summary, the main advantage of the embodiments of the disclosure is that it satisfies the perceived demand of a user for sorting news in a chronological order without restricting the chance of recommending good news due to the sorting, which can provide the user experience of supporting the infinite refreshing. It also distinguishes the refresh demands of two different types, that is, pull-up refreshing and pull-down refreshing.

Each of the functional units provided in the embodiment of the present application may be operated in a mobile terminal, a computer terminal or a similar arithmetic device, or may be stored as a part of the storage medium.

Thus, embodiments of the disclosure may provide a computer terminal that may be any of computer terminal devices in a computer terminal group. Optionally, in the present embodiment, the above computer terminal may be replaced with a terminal device such as a mobile terminal.

Optionally, in the present embodiment, the above computer terminal may be located in at least one of the plurality of network devices in the computer network.

In the present embodiment, the above computer terminal may execute the program code of the following steps in the method for refreshing a news list: receiving a refreshing signal; reading a refreshing start time according to the received refreshing signal, wherein the refreshing start time is the current system time or a recommending time for the last piece of news that has been refreshed; reading at least one pre-set time threshold, the time threshold is used for defining, in combination with the refreshing start time, a time interval for refreshing a news list; acquiring a recommended news list according to the refreshing start time and the time threshold, the recommended news list including: at least one piece of news to be recommended, the publication time of the news to be recommended falls within the time interval; allocating a recommending time for each piece of news to be recommended in the recommended news list; and refreshing the news to be recommended in the recommended news list according to the recommended time to generate a new recommended news list.

Optionally, the computer terminal may include one or more processors, memories, and transmitting devices.

Herein the memory can be used to store software programs and components, such as program instructions/components corresponding to the method and device for refreshing a news list in the embodiments of the disclosure, and the processor performs various function applications and data processing by running software programs and components stored in the memory, that is, achieving the above method for refreshing a news list. The memory may include a high-speed random access memory, and may include a non-volatile memory such as one or more magnetic storage devices, flash memories, or other non-volatile solid state memories. In some examples, the memory may further include a memory remotely provided with respect to the processor, which may be connected to the terminal via a network. Examples of the above networks include, but are not limited to, the Internet, the intranet, the local area network, the mobile communication network, and combinations thereof.

The above transmitting device is for receiving or transmitting data via a network. The specific example of the above network may include a wired network and a wireless network. In one example, the transmitting device includes a Network Interface Controller (NIC) that can be connected to the router via a network cable and other network devices to communicate with the Internet or the local area network. In one example, the transmitting device is a Radio Frequency (RF) component for wirelessly communicating with the Internet.

Herein specifically, the memory is used for storing information of a preset action condition and a preset privileged user and an application program.

The processor may call the information and application program stored in the memory by means of the transmitting device to execute the program code of the method steps of various optional or preferred embodiments in the above method embodiments.

It will be understood by those of ordinary skill in the art that computer terminals may also be terminal devices such as smartphones (such as Android phones, iOS phones, etc.), tablet PCs, palm computers, Mobile Internet Devices (MIDs), and PADs.

It will be understood by those of ordinary skill in the art that all or a part of steps in the various methods of the above embodiments may be accomplished by a program instructing the terminal device related hardware, and the program may be stored in a computer readable storage medium. The storage medium may include: a flash disk, a Read-Only Memory (ROM), a Random Access Memory (RAM), a magnetic disk or an optical disk.

The embodiment of the disclosure also provides a storage medium. Alternatively, in the embodiment, the above storage medium may be used for storing the program code executed by the page layout method provided by the method embodiment and system embodiment described above.

Optionally, in the embodiment, the above storage medium may be located in any of the computer terminals in the computer terminal group in the computer network or in any of the mobile terminals in the mobile terminal group.

Optionally, in the embodiment, the storage medium is configured to store the program code for performing the following steps: receiving a refreshing signal; reading a refreshing start time according to the received refreshing signal, wherein the refreshing start time is the current system time or a recommending time for the last piece of news that has been refreshed; reading at least one pre-set time threshold, the time threshold is used for defining, in combination with the refreshing start time, a time interval for refreshing a news list; acquiring a recommended news list according to the refreshing start time and the time threshold, the recommended news list including: at least one piece of news to be recommended, the publication time of the news to be recommended falls within the time interval; allocating a recommending time for each piece of news to be recommended in the recommended news list; and refreshing the news to be recommended in the recommended news list according to the recommended time to generate a new recommended news list.

Optionally, in the present embodiment, the storage medium may also be configured to store the program code of various preferred or optional method steps provided by the method for refreshing a news list.

The above is only the preferred embodiment of the disclosure and not intended to limit the disclosure, and for the technician of the field, the embodiments of the disclosure may have various modifications and variations. Any modifications, equivalent replacements, improvements and the like within the spirit and principle of the embodiments of the disclosure shall fall within the scope of protection as defined in the embodiments of the disclosure.

What is claimed is:

1. A method for refreshing a news list, wherein the method comprises:
   receiving a refreshing signal;
   reading a refreshing start time according to the received refreshing signal, wherein the refreshing start time is a current system time or a recommending time for a last piece of news that has been refreshed;
   reading at least one preset time threshold, wherein the at least one preset time threshold is used for defining, in combination with the refreshing start time, a time interval for refreshing the news list;
   acquiring a recommended news list according to the refreshing start time and the at least one preset time threshold, wherein the recommended news list comprises: at least one piece of news to be recommended, and a publication time of the news to be recommended falls within the time interval;
   allocating a recommending time for each piece of news to be recommended in the recommended news list; and
   refreshing the news to be recommended in the recommended news list according to the recommending time to generate a new recommended news list.

2. The method as claimed in claim 1, wherein the refreshing signal comprises at least one of: a first touch-sensitive signal generated by sliding down on a touch screen and a second touch-sensitive signal generated by sliding up on the touch screen.

3. The method as claimed in claim 2, wherein in a case that the received refreshing signal is the first touch-sensitive signal, the refreshing start time is the current system time, wherein acquiring the recommended news list according to the refreshing start time and the at least one preset time threshold comprises:
   acquiring an amount n of news of a first news set contained in the recommended news list according to the first touch-sensitive signal, where n is a natural number;
   acquiring the current system time and a preset first time threshold;
   determining a first time interval according to the current system time and the preset first time threshold, wherein the first time interval is used for restricting a time interval for refreshing a first recommended news list;
   acquiring n pieces of news, the publication time of which falls within the first time interval; and
   generating the first recommended news list according to the acquired n pieces of news.

4. The method as claimed in claim 3, wherein allocating the recommending time for each piece of news to be recommended in the recommended news list comprises:
   acquiring a previous refreshing time of refreshing the news list which is conducted upon receiving a previous first touch-sensitive signal;
   determining a second time interval according to the previous refreshing time and the current system time, wherein the second time interval is used for restricting a recommending time for news in the first recommended news list; and
   allocating the recommending time for each piece of the news in the first recommended news list according to the second time interval, wherein the recommending time falls within the second time interval.

5. The method as claimed in claim 4, wherein allocating the recommending time for each piece of the news in the first recommended news list according to the second time interval comprises:
   allocating the second time interval evenly according to the amount n of news in the first recommended news list and the second time interval to acquire a first equal time interval of each piece of news in the first recommended news list; and
   allocating the recommending time for each piece of the news within the first recommended news list according to the first equal time interval and the current system time.

6. The method as claimed in claim 2, wherein in a case that the received refreshing signal is the second touch-sensitive signal, the refreshing start time is the recommending time for the last piece of news that has been refreshed, wherein acquiring the recommended news list according to the refreshing start time and the at least one preset time threshold comprises:
   acquiring an amount m of news of a second news set contained in the recommended news list according to the second touch-sensitive signal, where m is an integer;
   acquiring the recommending time for the last piece of news that has been refreshed and a second time threshold;
   determining a third time interval according to the recommending time for the last piece of news that has been refreshed and the second time threshold, wherein the third time interval is used for restricting a time interval for refreshing a second recommended news list;
   acquiring m pieces of news, the publication time of which falls within the third time interval; and
   generating the second recommended news list according to the acquired m pieces of news.

7. The method as claimed in claim 6, wherein allocating the recommending time for each piece of news to be recommended in the recommended news list comprises:
   acquiring the recommending time for the last piece of news that has been refreshed and a third time threshold;

determining a fourth time interval according to the recommending time for the last piece of news that has been refreshed and the third time threshold, wherein the fourth time interval is used for restricting a recommending time for news in the second recommended news list; and allocating the recommending time for each piece of the news in the second recommended news list according to the fourth time interval, wherein the recommending time falls within the fourth time interval.

8. The method as claimed in claim 7, wherein allocating the recommending time for each piece of the news in the second recommended news list according to the fourth time interval comprises:

allocating the fourth time interval evenly according to the amount m of news in the second recommended news list and the fourth time interval to acquire a second equal time interval of each piece of news in the second recommended news list; and allocating the recommending time for each piece of the news within the second recommended news list according to the second equal time interval and the recommending time for the last piece of news that has been refreshed.

9. The method as claimed in claim 1, wherein prior to allocating the recommending time for each piece of news to be recommended in the recommended news list, the method further comprises:

acquiring a historical news list that has been acquired by refreshing before instant refreshing; and comparing the historical news list and the recommended news list and, in a case that a piece of news in the recommended news list is a same piece of news as a piece of news in the historical news list, deleting the same piece of news from the recommended news list.

10. The method as claimed in claim 2, wherein prior to allocating the recommending time for each piece of news to be recommended in the recommended news list, the method further comprises:

acquiring a historical news list that has been acquired by refreshing before instant refreshing; and comparing the historical news list and the recommended news list and, in a case that a piece of news in the recommended news list is a same piece of news as a piece of news in the historical news list, deleting the same piece of news from the recommended news list.

11. A device for refreshing a news list, wherein the device comprises:

a hardware processor coupled with a memory and configured to execute program instructions stored on the memory, wherein the program instructions comprise:

receiving a refreshing signal;

reading a refreshing start time according to the received refreshing signal, wherein the refreshing start time is the current system time or a recommending time for a last piece of news that has been refreshed;

reading at least one preset time threshold, the at least one preset time threshold is used for defining, in combination with the refreshing start time, a time interval for refreshing a news list;

acquiring a recommended news list according to the refreshing start time and the at least one preset time threshold, the recommended news list comprises at least one piece of news to be recommended, and a publication time of the news to be recommended falls within the time interval;

allocating a recommending time for each piece of news to be recommended in the recommended news list; and refreshing the news to be recommended in the recommended news list according to the recommending time to generate a new recommended news list.

12. The device as claimed in claim 11, wherein in a case that the received refreshing signal is a first touch-sensitive signal generated by sliding down on a touch screen, the refreshing start time is the current system time, wherein the program instructions comprise:

acquiring the amount n of news of a first news set contained in the recommended news list according to the first touch-sensitive signal, where n is a natural number;

acquiring the current system time and a preset first time threshold;

determining a first time interval for restricting a time interval for refreshing a first recommended news list according to the current system time and the preset first time threshold;

acquiring n pieces of the news, the publication time of which falls within the first time interval; and generating the first recommended news list according to the acquired n pieces of the news.

13. The device as claimed in claim 12, wherein the program instructions comprise:

acquiring the first touch-sensitive signal which is previously received and a previous refreshing time of refreshing the news list;

determining a second time interval for restricting a recommending time for the news in the first recommended news list according to the previous refreshing time and the current system time; and allocating the recommending time for each piece of the news in the first recommended news list according to the second time interval, wherein the recommending time falls within the second time interval.

14. The device as claimed in claim 13, wherein the program instructions comprise:

allocating the second time interval evenly according to the amount n of news in the first recommended news list and the second time interval to acquire a first equal time interval of each piece of the news in the first recommended news list; and allocating the recommending time for each piece of the news within the first recommended news list according to the first equal time interval and the current system time.

15. The device as claimed in claim 11, wherein in a case that the received refreshing signal is a second touch-sensitive signal generated by sliding up on the touch screen, the refreshing start time is the recommending time for the last piece of news that has been refreshed, wherein the program instructions comprise:

acquiring the amount m of news of a second news set contained in the recommended news list according to the second touch-sensitive signal, where m is an integer;

acquiring the recommending time for the last piece of news that has been refreshed and a second time threshold;

determining a third time interval for restricting a time interval for refreshing a second recommended news list according to the recommending time for the last piece of news that has been refreshed and the second time threshold;

acquiring m pieces of the news, the publication time of which falls within the third time interval; and generating the second recommended news list according to the acquired m pieces of the news.

16. The device as claimed in claim 15, wherein the program instructions comprise:

acquiring the recommending time for the last piece of news that has been refreshed and a third time threshold;

determining a fourth time interval for restricting a recommending time for the news in the second recommended news list according to the recommending time for the last piece of news that has been refreshed and the third time threshold; and allocating the recommending time for each piece of the news in the second recommended news list according to the fourth time interval, wherein the recommending time falls within the fourth time interval.

17. The device as claimed in claim 16, wherein the program instructions comprise:

allocating the fourth time interval evenly according to the amount m of news in the second recommended news list and the fourth time interval to acquire a second equal time interval of each piece of the news in the second recommended news list; and allocating the recommending time for each piece of the news within the second recommended news list according to the second equal time interval and the recommending time for the last piece of news that has been refreshed.

18. The device as claimed in claim 11, wherein the program instructions comprise:

acquiring a historical news list that has been acquired by refreshing before instant refreshing; and comparing the historical news list and the recommended news list and, in a case that a piece of news in the recommended news list is a same piece of news as a piece of news in the historical news list, deleting the same piece of news from the recommended news list.

19. A non-transitory storage medium comprising computer program code configured for execution by a computer processor comprising the following steps:

receiving a refreshing signal;

reading a refreshing start time according to the received refreshing signal, wherein the refreshing start time is a current system time or a recommending time for a last piece of news that has been refreshed;

reading at least one preset time threshold, wherein the at least one preset time threshold is used for defining, in combination with the refreshing start time, a time interval for refreshing the news list;

acquiring a recommended news list according to the refreshing start time and the at least one preset time threshold, wherein the recommended news list comprises: at least one piece of news to be recommended, and a publication time of the news to be recommended falls within the time interval;

allocating a recommending time for each piece of news to be recommended in the recommended news list; and refreshing the news to be recommended in the recommended news list according to the recommending time to generate a new recommended news list.

* * * * *